(12) United States Patent
Kiyamura et al.

(10) Patent No.: US 8,508,161 B2
(45) Date of Patent: Aug. 13, 2013

(54) DRIVE APPARATUS

(75) Inventors: Kousuke Kiyamura, Kawasaki (JP);
Hiromu Yasuda, Kawasaki (JP);
Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/595,205

(22) Filed: Aug. 27, 2012

(65) Prior Publication Data

US 2012/0319633 A1    Dec. 20, 2012

Related U.S. Application Data

(62) Division of application No. 12/578,764, filed on Oct. 14, 2009, now Pat. No. 8,278,851.

(30) Foreign Application Priority Data

Oct. 20, 2008  (JP) .................................. 2008-270273

(51) Int. Cl.
*H02P 6/04*    (2006.01)

(52) U.S. Cl.
USPC .................. 318/400.11; 318/696; 318/400.01; 318/560; 318/701; 315/291; 348/335; 396/133; 396/101; 396/135; 396/136; 369/44.28; 369/44.29

(58) Field of Classification Search
USPC ............... 318/696, 685, 400.11, 400.01, 139, 318/400.02, 400.09, 245, 400.34, 400.36, 318/560, 400.35, 701, 817, 717, 376, 723, 318/400.33, 400.2; 315/291; 348/335; 396/133, 104, 101, 135, 136; 369/44.28, 369/44.29
See application file for complete search history.

(56) References Cited

U.S. PATENT DOCUMENTS

| | | | |
|---|---|---|---|
| 6,603,929 B2 * | 8/2003 | Ishikawa et al. | 396/133 |
| 2007/0177046 A1 * | 8/2007 | Makii | 348/335 |

FOREIGN PATENT DOCUMENTS

| | | |
|---|---|---|
| JP | 10-062679 A | 3/1998 |
| JP | 10-094286 A | 4/1998 |
| JP | 2002-199768 A | 7/2002 |
| JP | 2004-056856 A | 2/2004 |
| JP | 2005-282877 A | 10/2005 |

OTHER PUBLICATIONS

The above references were cited in a May 21, 2013 Japanese Office Action, which is enclosed without an English Translation, that issued in Japanese Patent Application No. 2008-270273.

* cited by examiner

*Primary Examiner* — Eduardo Colon Santana
*Assistant Examiner* — Jorge Carrasquillo
(74) *Attorney, Agent, or Firm* — Cowan, Liebowitz & Latman, P.C.

(57) ABSTRACT

A drive apparatus includes a magnet rotor having a plurality of magnetic poles that are magnetized, a stator having a magnetic pole portion that opposes each pole of the magnet rotor, a coil configured to excite the magnetic pole portion, a position detector configured to detect a position of the magnet rotor, a first driver configured to switch an electrification state of the coil in accordance with a preset time interval, a second driver configured to switch an electrification state of the coil in accordance with an output of the position detector, and a controller configured to select the first driver when the output of the position detector is less than a first threshold, and to select the second driver when the output of the position detector is equal to or larger than the first threshold.

4 Claims, 15 Drawing Sheets

DRIVE APPARATUS

CROSS-REFERENCE TO RELATED APPLICATIONS

This application is a divisional of application Ser. No. 12/578,764, filed Oct. 14, 2009 the entire disclosure of which is hereby incorporated by reference.

BACKGROUND OF THE INVENTION

1. Field of the Invention

The present invention relates to a motor drive apparatus and an electronic apparatus.

2. Description of the Related Art

A stepping motor is advantageous to a miniaturization. In order to prevent stepping out, it is known to attach a position detector configured to detect a rotational position of a rotor to the stepping motor and to provide a feedback control that switches an electrification state to a coil in accordance with its output. Japanese Patent Laid-Open No. ("JP") 10-150798.

Other prior art include JP 09-331666.

Due to the heat generation of the coil and the environmental temperature rise at the motor driving time, the magnetic force of the magnet decreases (demagnetization) as the motor's temperature in the motor rises. When the position detector is a Hall element configured to detect the magnetic force, its output decreases due to the demagnetization. The output decreases as well due to the temperature rise of the position detector and a drop of the sensitivity. A low output of the position detector is subject to the influence of noises and driving of the motor in accordance with the feedback control becomes unstable. This problem becomes more conspicuous in a small stepping motor in which the coil is comparatively close to the motor or the position detector.

SUMMARY OF THE INVENTION

The present invention provides a motor drive apparatus configured to provide an open loop control and a feedback control, and to stably and continuously drive a motor in a feedback control.

A motor drive apparatus according to one aspect of the present invention includes a magnet rotor having a plurality of magnetic poles that are magnetized, a stator having a magnetic pole portion that opposes each pole of the magnet rotor, a coil configured to excite the magnetic pole portion, a position detector configured to detect a position of the magnet rotor, a first driver configured to switch an electrification state of the coil in accordance with a preset time interval, a second driver configured to switch an electrification state of the coil in accordance with an output of the position detector, and a controller configured to select the first driver when the output of the position detector is less than a first threshold, and to select the second driver when the output of the position detector is equal to or larger than the first threshold.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
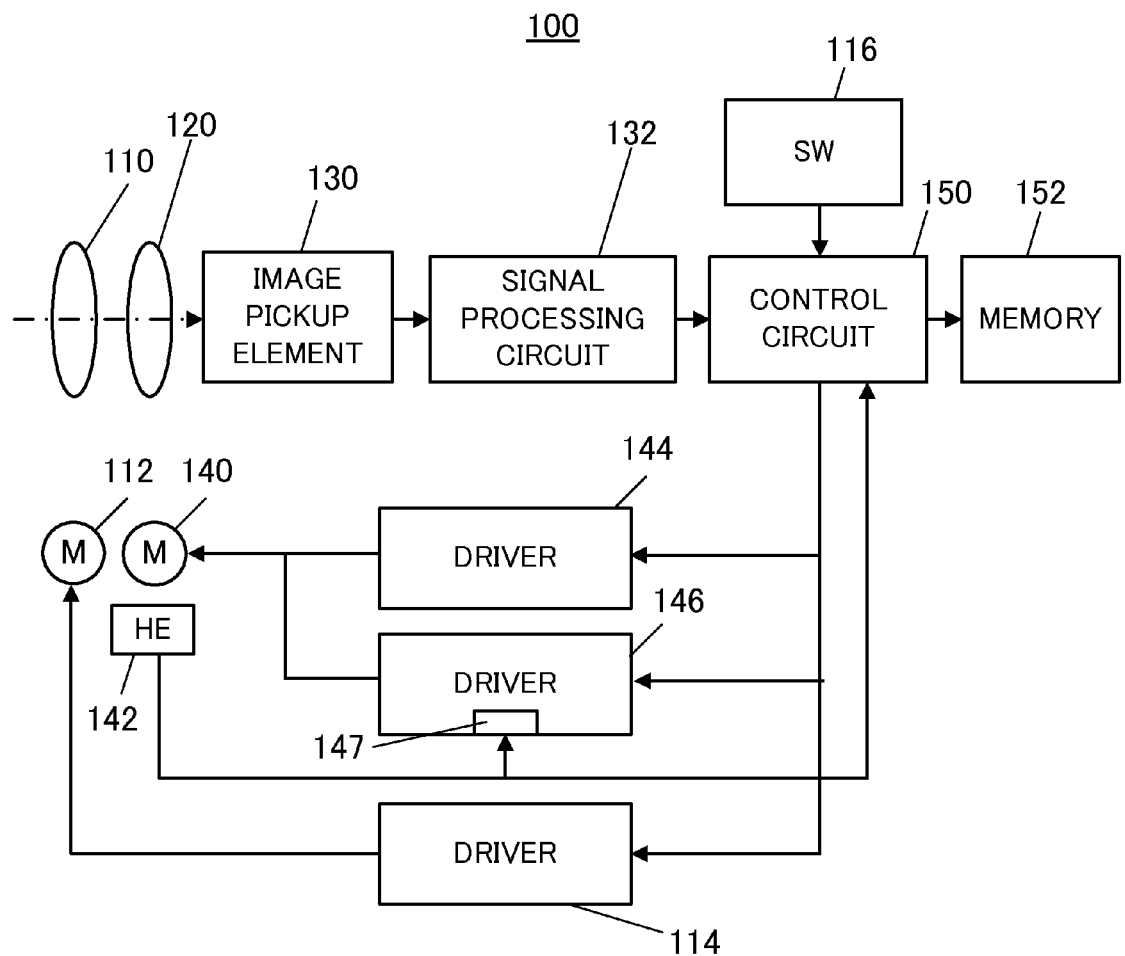
FIG. 1 is a block diagram of a camera according to a first embodiment.

FIG. 1 is a block diagram of a digital camera 100, such as an image pickup apparatus or electronic apparatus. The electronic apparatus according to this embodiment may be an optical disk apparatus or a printer, other than an electronic unit (image pickup apparatus) such as a digital camera and a video camera, and generally includes a controlled object (driven member) and a motor drive apparatus configured to drive and position the control object using a motor. In addition, the control object (driven member) is not limited, and an optical member, a stop blade configured to adjust a lens opening, an image stabilization lens, and a driven object in an application other than the optical unit.

The camera 100 includes a zoom system, a focus control unit, and a control system.

The zoom system includes a zoom lens 110, a motor 112, a driver 114, a zoom switch 116, and a control circuit 150 in the control system. The zoom lens 110 provides zooming, and is driven by the motor 112, and changes a magnification of an image on an image pickup plane of an image pickup device 130, which will be described later. The motor 112 is a stepping motor driven by the driver 114, and configured to drive the zoom lens 110. The driver 114 is a stepping motor driver configured to drive the motor 112 in accordance with a drive signal output from the control circuit 150. The zoom switch ("SW") 116 outputs a zoom instruction signal when the user operates. The control circuit 150 outputs a zoom lens drive signal to the driver 114 in accordance with a zoom instruction signal output from the zoom switch 116, and controls the motor 112 for zooming.

The focus control unit includes a focus lens (optical element) 120, an image signal generator, a focus state detector, and a motor driver (motor drive apparatus).

The focus lens 120 provides a focus control, is driven by the motor driver, and changes a focus state of an image on the image pickup plane of the image pickup device 130 in the signal generator. In addition, the focus lens 120 can correct a change of a focus state of an image on the image pickup plane of the image pickup device 130 in the zooming of the zoom lens 110.

The image signal generator detects an image formed by an optical element, such as the zoom lens 110 and the focus lens 120, and outputs an image signal. The image signal generator includes the image pickup device 130, and a signal processing circuit 132. The image pickup device 130 includes a photoelectric conversion element, such as a CCD or a CMOS detector, converts light that enters from the outside via the zoom lens 110 and the focus lens 120, and outputs it. The signal processing circuit 132 processes an electric signal output from the image pickup device 130, and outputs it as a video signal. More specifically, the signal processing circuit 132 performs a gain control and a gamma processing for an analogue signal output from the image pickup device 130, and outputs a digital video signal such as RGB image data.

The focus state detector detects a focus state based on a contrast value of an image based on an image signal output from an image signal generator, and includes a control circuit (controller) 150 in this embodiment.

The motor driver is used to move the focus lens 120 in the focus control. The motor driver includes a motor 140, a position detector 142, a first driver 144, a second driver 146, a control circuit (controller) 150 of the control system, and a memory 152.

The motor 140 is driven by the first driver 144 or the second driver 146, and drives the focus lens 120. The position detector 142 detects a (rotational) position of a rotor of the motor 140, and outputs a detection signal.

Figure 2:
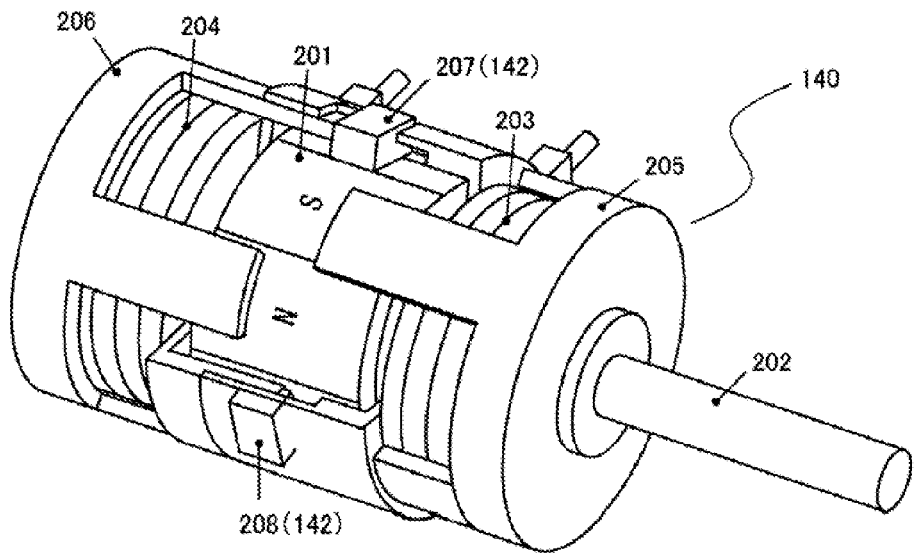
FIG. 2 is a perspective view of a motor and position detectors shown in FIG. 1.

FIG. 2 is a perspective view showing an illustrative structure of the motor 140 and the position detector 142. For description purposes, part of components is severed and shown. The motor structure is the same as that disclosed in JP 09-331666.

Referring to FIG. 2, the motor 140 includes a rotor 202 having a magnet 201, a pair of coils 203 and 204, a pair of yokes 205 and 206, and a pair of position detectors 207 and 208. Each of the position detectors 207 and 208 corresponds to the position detector 142 shown in FIG. 1. A pair of coils 203 and 204, a pair of yokes 205 and 206, and a pair of position detectors 207 and 208 constitute a stator.

The magnet 201 is a cylindrical permanent magnet having an outer circumference magnetized with multiple poles. The magnet 201 has a magnetized pattern in which the magnetic force changes in a sinusoidal shape in the radial direction with respect to an angular position. The magnet 201 may be made of a neodymium magnet having a high magnetic flux density. The rotor 202 is supported rotatably by the stator, and integrally fixed with the magnet 201. The yoke 205 has a plurality of pole teeth excited by the coil 203. A torque given to the rotor 202 can be varied by changing an excited pole. The yoke 206 has a plurality of pole teeth excited by the coil 204. A torque given to the rotor 202 can be varied by changing an excited pole.

A pair of position detectors 207 and 208 are Hall elements each configured to detect the magnetic flux of the magnet 201, and to output detection signals having phases that shift by an electric angle of 90°. Where n is the number of poles of the magnet 201, the electric angle of 360° corresponds to an angle of 720/n° of the actual rotor. A method of detecting the rotational position of the rotor 202 is not limited. A detection magnet that displaces along with a rotation of the rotor 202 may be arranged and detected, or an optical detector may read a light shielding plate or a patterned surface. In addition, the position detector 142 may be integrated with and fixed onto the motor 140, or fixed onto a member separate from the motor 140.

The first driver 144 drives the motor 140 in accordance with an open loop control that switches between the electrization to the coil 203 and the electrization to the coil 204 in the motor 140 in accordance with the drive signal output from the control circuit 150. This driving will be sometimes referred to as "OP driving" hereinafter.

The second driver 146 includes a fast angle circuit (fast angle signal generator) 147 configured to generate a fast angle signal having an arbitrary phase difference (fast angle) to a detection result or signal of the position detector 142. The second driver 146 drives the motor 140 in accordance with a feedback control that switches the electrification to the coil 203 and the electrification to the coil 204 in accordance with the drive signal output from the control circuit 150 and the fast angle signal output from the fast angle circuit 147. This driving will be sometimes referred to as "FB driving" hereinafter.

The control circuit 150 outputs the focus lens drive signal to the first driver 144 or the second driver 146, selects one of them, and controls the motor 140 for the focus control. In that case, the control circuit 150 selects one of the first driver 144 and the second driver 146 in accordance with the position detector 142 so as to switch driving of the focus lens 120 between the OP driving and the FB driving. Moreover, the control circuit 150 supplies the fast angle setting signal to the fast angle circuit 147, and sets a phase of the fast angle circuit 147. The control circuit 150 may have a built-in timer. The memory 152 stores a variety of thresholds necessary for the operation of the control circuit 150, which will be described later.

This embodiment separately provides the first driver 144 and the second driver 146 as separate units so that the driving control can be changed between the OP driving and the FB driving. However, a single driver may serve as both the first driver 144 and the second driver 146 so as to change between the OP driving and the FB driving.

The control circuit 150 of the control system processes the digital video signal output from the signal processing circuit 132 and outputs storage data to the memory 152. The memory 152 can record storage data output from the control circuit 150. A type of the memory 152 is not limited, and a variety of memories are usable, such as a memory card, a camera built-in memory, a tape, and a disk.

The motor 140 can provide an open loop electrification switching driving (OP driving) using the first driver 144. The OP driving is similar to the open loop control of the usual stepping motor, and configured to change the electrification to the coil 203 and the electrification to the coil 204 in the motor 140 in accordance with a preset time interval. In other words, the first driver 144 sequentially changes the electrification to the coil 203 and the electrification to the coil 204 in accordance with the input driving pulse interval (driving frequency) and the rotational direction, thereby rotating the rotor 202 at a predetermined velocity (velocity control). In addition, the first driver 144 can rotate the rotor 202 by a predetermined angle in accordance with the number of input driving pulses (position control). The OP driving follows the preset time interval (driving pulse interval), and is not subject to the output changes of the position detector 142. However, according to the OP driving, as the driving velocity increases (as the driving pulse interval decreases), the rotor 202 cannot respond to switching between the electrification to the coil 203 and the electrification to the coil 204, causing stepping out. It is therefore necessary to provide a lower limit to the driving pulse interval, but this limitation restricts the high-speed driving.

The motor 140 uses the second driver 146 and can provide the feedback electrification switching driving (FB driving). The FB driving is driving that is configured to switch the coil electrification state in accordance with the output of the position detector 142. In other words, the second driver 146 sequentially switches between the electrification to the coil 203 and the electrification to the coil 204 in accordance with the number of input driving pulses, the rotation direction, and the fast angle signal generated based on the detection signal output from the position detector 142. Thereby, the rotor 202 can be rotated by a predetermined angle (position control). In addition, the rotor 202 can be rotated by a predetermined torque by controlling the current in the coil 203 or 204 (current control). The torque—the number of rotations characteristic can be changed by controlling a phase difference (fast angle) between the detection signal and the fast angle signal (fast angle control). The FB driving can restrain stepping out because it switches between the electrification to the coil 203 and the electrification to the coil 204 in accordance with the position of the rotor 202, and achieves high-speed driving but as the output of the position detector 142 lowers the FE driving is subject to the noises and becomes unstable.

Figure 3:
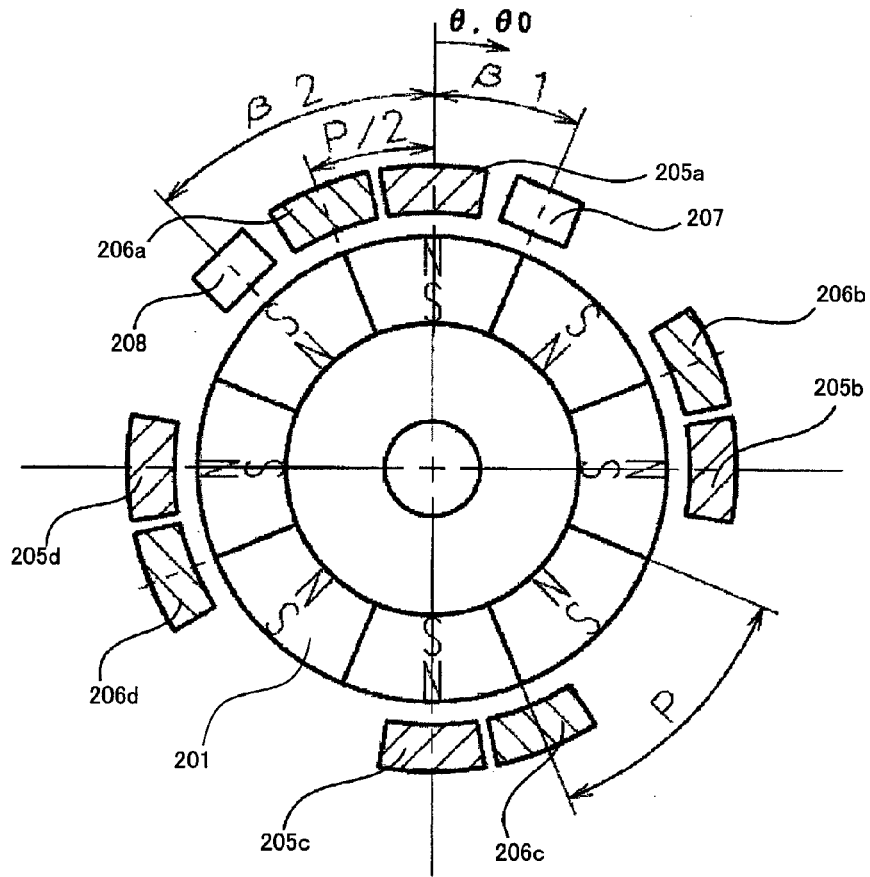
FIG. 3 is a sectional view showing a phase relationship among yokes, the position detectors, and a rotor shown in FIG. 2.

FIG. 3 is a sectional view in the axial direction showing a phase relationship among the yokes, the position detectors, and the rotor. In FIG. 3, the clockwise direction is a positive direction. 205a to 205d denote pole teeth of the yoke 205, and 206a to 206d are pole teeth of the yoke 206. In this embodiment, the magnet has 8 poles with a magnetization angle P of 45°. In addition, when the yoke 205 is used as a reference, the yoke 206 has a phase P/2 of −22.5°, the position detector 207 has a phase β1 of +22.5°, and the position detector 208 has a phase β2 of −45°.

The following description discusses an operation of the FB driving by using the electric angle. The electric angle is expressed on the assumption that one period of the magnet's power is 360°, and an electric angle θ is expressed as follows where M is the rotor's pole number, $\theta_o$ is an actual angle:

$$\theta = \theta_o \times M/2 \qquad \text{EQUATION 1}$$

Each of a phase difference between the yokes 205 and 206, a phase difference between the position detectors 207 and 208, a phase difference between the yoke 205 and the position detector 207 is set to an electric angle of 90°. In FIG. 3, the yoke 205's pole teeth center opposes to the magnet's N pole center. Assume that this state is the rotor 202's initial state and an electric angle is 0°.

Figure 4:
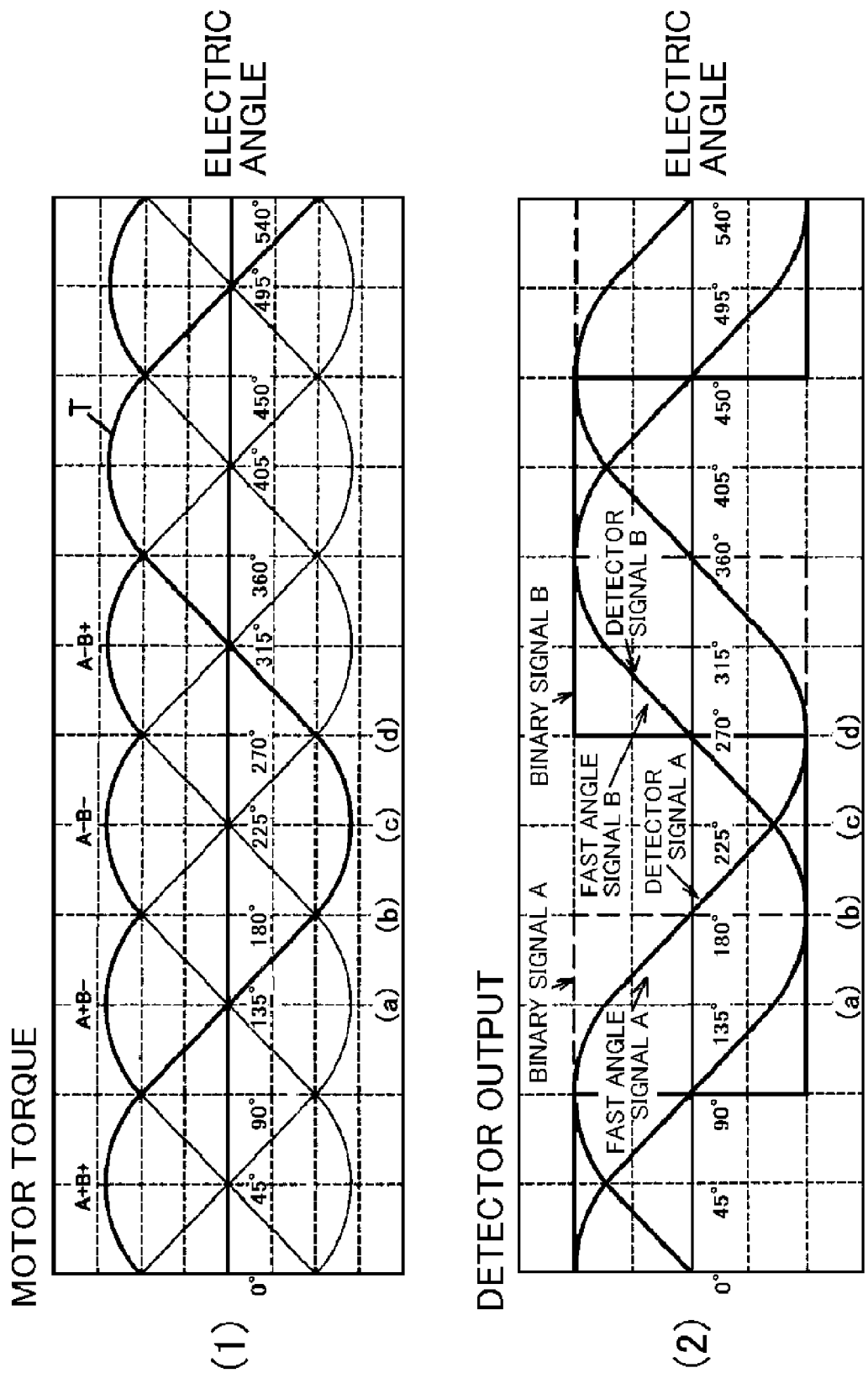
FIG. 4 is a graph showing a relationship among a rotational angle of the rotor shown in FIG. 2, the motor torque, and signal outputs from the position detectors.

FIG. 4(1) is a graph showing a relationship between the rotational angle of the rotor 202 and the motor torque, where the abscissa axis denotes an electric angle and the ordinate axis denotes a motor torque. Assume that a motor torque that rotates the rotor 202 clockwise is positive. When the current is flowed in the coil 203 in the positive diction, the yoke 205 is magnetized with an N pole and an electromagnetic force is generated between the yoke 205 and the magnetic pole of the magnet 201. When the current in the positive direction is flowed in the coil 204, the yoke 206 is magnetized with an N pole and an electromagnetic force is generated with the yoke 206 and the magnetic pole of the magnet 201. When two electromagnetic forces are synthesized, a schematically sinusoidal torque T is obtained as the rotor 202 rotates (torque curve A+B+). In other electrization states, similarly schematically sinusoidal torques T are obtained (torque curves A+B−, A−B−, A−B+). In addition, the yoke 205 is arranged relative to the yoke 206 with a phase of an electric angle of 90°. Thus, four torques have phase differences corresponding to an electric angle of 90°.

FIG. 4(2) is a graph showing a relationship between the rotational angle of the rotor 202 and the signal output of the position detector 142, where the abscissa axis denotes an electric angle and the ordinate axis denotes the signal output of the position detector 142. The magnet 201 has a schematically sinusoidal magnetized pattern relative to the electric angle in the radial direction. Therefore, a schematic sine wave signal is obtained from the position detector 207 (detector signal A). In this embodiment, the position detector 207 outputs a positive value when it faces the N pole of the magnet 201. In addition, the position detector 208 is arranged with a phase of an electric angle of 90° relative to the position detector 207, and thus a cosine wave signal is obtained from the position detector 208 (detector signal B). In this embodiment, the position detector 208 has an inverted polarity to the position detector 207, and thus outputs a positive value when it faces the S pole of the magnet 201.

The fast angle circuit 147 provides an operation based on an output of the position detector 207 and an output of the position detector 208, and outputs a first fast angle signal and a second fast angle signal having arbitrary fast angles set by the control circuit 150. An operation method of the fast signal will be described below.

Each signal can be expressed below where θ is an electric angle, HE1 is an output of the position detector 207, and HE2 is an output of the position detector 208:

$$HE1 = \sin\theta \qquad \text{Equation 2}$$

$$HE2 = \cos\theta \qquad \text{Equation 3}$$

The first fast angle signal PS1 that moves forward by the fast angle α, and the second fast angle signal PS2 that moves forward by the fast angle α can be expressed with HE1, HE2, and α:

$$PS1 = \sin(\theta+\alpha) = HE1 \times \cos\alpha + HE2 \times \sin\alpha \qquad \text{Equation 4}$$

$$PS2 = \cos(\theta+\alpha) = HE2 \times \cos\alpha - HE1 \times \sin\alpha \qquad \text{Equation 5}$$

In this embodiment, the fast angle circuit 147 utilizes these operational equations.

Figure 5:
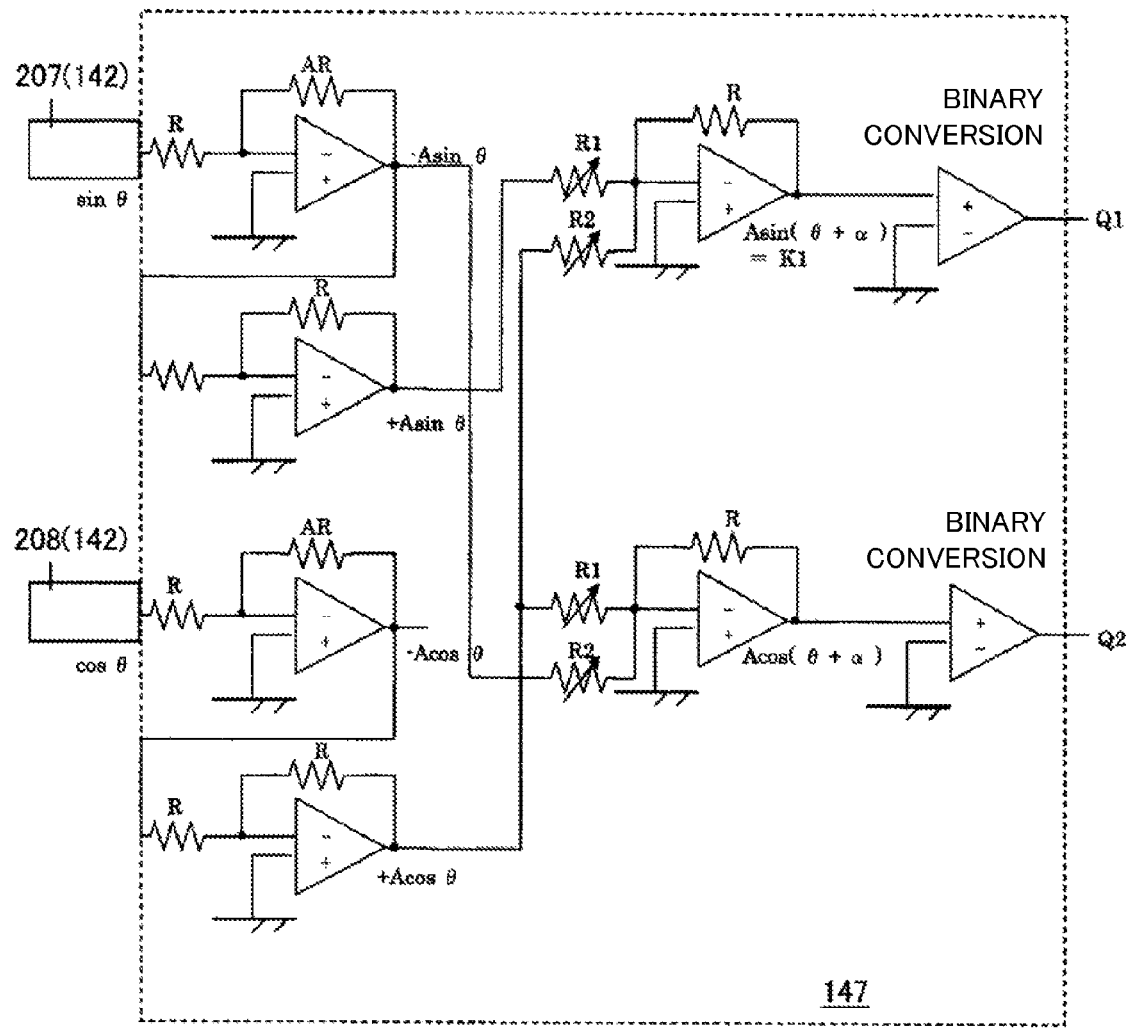
FIG. 5 is a circuit diagram of a fast angle circuit shown in FIG. 1.

FIG. 5 is a circuit diagram of the fast angle circuit 147. The fast angle circuit 147 that includes an analogue circuit shown in FIG. 5, for example, can achieve the above operations. Initially, a signal from each position detector amplified by an amplification factor "A," and an inverted signal of the amplified signal are prepared (A sin θ, A cos θ, −A sin θ, −A cos θ). The fast angle signals are generated by adding and multiplying the resistance values R1 and R2. The first fast angle signal PS1 and second fast angle signal PS2 are expressed as follows:

$$PS1 = A \times (R/R1) \times \sin\theta + A \times (R/R2) \cos\theta \qquad \text{Equation 6}$$

$$PS2 = A \times (R/R1) \times \cos\theta - A \times (R/R2) \sin\theta \qquad \text{Equation 7}$$

The fast angle signal that is advanced by an arbitrary angle α can be generated by selecting variable resistances R, R1, and R2 in the circuit as follows:

$$R/R1 = \cos\alpha \quad \text{Equation 8}$$

$$R/R2 = \sin\alpha \quad \text{Equation 9}$$

Binary signals are output by converting the first fast angle signal PS1 and the second fast angle signal PS2 into binary forms using a comparator.

The above generation method of the fast angle signal is merely illustrative, and the present invention is not limited to this embodiment. A known method may be used to obtain a similar effect to the above fast angle generating method, for example, by generating a fast angle signal by using a digital circuit that provides the above operations or by using a high-resolution encoder to adjust an electrization switching pulse interval.

A description of the FB driving when the fast angle of a fast angle signal is zero which is output from the fast angle circuit 147. In FIG. 4(2), the fast angle signals A and B are signals made by performing the above operations for the detector signals A and B to provide fast angles to them. In FIG. 4(2), the fast angle is zero, the detector signal A accords with the fast angle signal A, and the detector signal B accords with the fast angle signal B. The binary signals A and B are signals by forming the fast angle signals A and B into binary signals using a comparator.

In the FB driving, the electrification to the coil 203 is changed based on the binary signal A, and the electrification to the coil 204 is changed based on the binary signal B. In other words, when the binary signal A has a positive value, the current in the positive direction is flowed in the coil 203, and when the binary signal A has a negative value, the current in the reverse direction is flowed in the coil 203. In addition, when the binary signal B has a positive value, the current in the positive direction is flowed in the coil 204, and when the binary signal B has a negative value, the current in the reverse direction is flowed in the coil 204.

Figure 6:
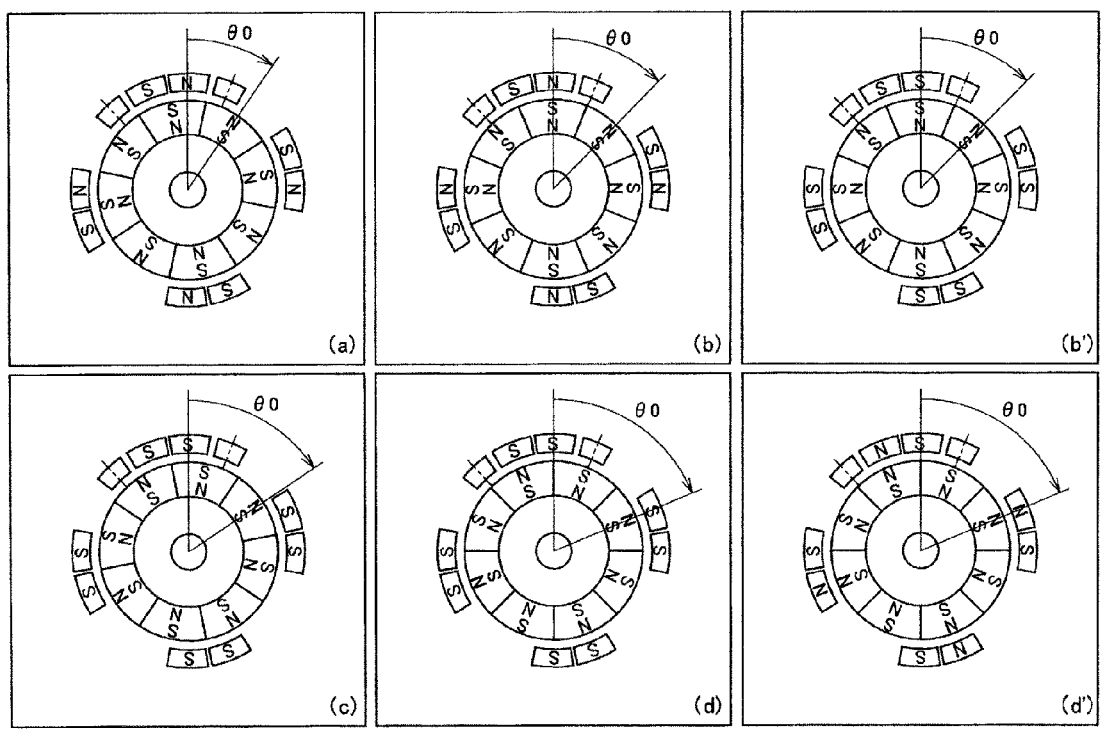
FIG. 6 is a sectional view of the yokes, the position detectors, and the rotor shown in FIG. 2 in the feedback driving.

FIG. 6 is a sectional view in the axial direction showing an operation of the FB driving.

FIG. 6A shows a state in which the rotor 202 rotates by an electric angle of 135°. Each fast angle signal has a value shown FIG. 4(2)(a), where a binary signal A is a positive value and a binary signal B is a negative value. Thus, the current flows in the coil 203 in the positive direction, and the yoke 205 is magnetized with the N pole, and the current flows in the coil 204 in the reverse direction, and the yoke 206 is magnetized with the S pole. At this time, a clockwise torque corresponding to a torque curve A+B− shown in FIG. 4(1) works, and the rotor 202 rotates in response to a rotational force in the θ direction.

FIG. 6B shows the rotor 202 that has rotated by an electric angle of 180°. The position detector 207 is located at the boundary between the N pole and the S pole in the magnet 201. Thus, the binary signal A is switched from the positive value to the negative value at the boundary of the electric angle of 180°, and the electrization direction to the coil 203 is switched from the positive direction to the reverse direction. This electric angle accords with the electric angle of the node between the torque curve A+B− and the torque curve A−B−.

FIG. 6B' shows a state in which the rotor 202 rotates by an electric angle of 180° and the electrization direction to the coil 203 is switched. The current flows in the coil 203 in the reverse direction and the yoke 205 is magnetized with the S pole; the current flows in the coil 204 in the reverse direction and the yoke 206 is magnetized with the S pole. At this time, a clockwise torque corresponding to the torque curve A−B− in FIG. 4(1) works, and the rotor 202 rotates in response to the rotational force in the θ direction.

FIG. 6C shows a state in which the rotor 202 rotates by an electric angle of 225°. Each fast angle signal has a value shown in FIG. 4(2)(c), and both the binary signals A and B have negative values. Thus, the current in the negative direction flows in the coil 203 and the yoke 205 is magnetized with the S pole; the current in the reverse direction flows in the coil 204 and the yoke 206 is magnetized with the S pole. At this time, a clockwise torque works corresponding to the torque curve A−B− shown in FIG. 4(1), and the rotor 202 rotates in response to the rotational force in the θ direction.

FIG. 6D shows a state in which the rotor 202 rotates by an electric angle of 270°. The position detector 208 is located at the boundary between the N pole and the S pole in the magnet 201. Therefore, at the boundary of an electric angle of 270°, the binary signal B switches from a negative value to a positive value and the electrization direction of the coil 204 is switched from the reverse direction to the positive direction. This electric angle accords with an electric angle of the node between the torque curve A−B− and the torque curve A−B+.

FIG. 6D' shows a state in which the rotor 202 rotates by an electric angle of 270° and the electrization direction to the coil 204 is switched. The current flows in the coil 204 in the positive direction, and the yoke 206 is magnetized with N pole; the current flows in the coil 203 in the reverse direction, and the yoke 205 is magnetized with the S pole. At this time, a clockwise torque works corresponding to the torque curve A−B+ shown in FIG. 4(1), and the rotor 202 rotates in response to the rotational force in the θ direction.

By repeating the above operations, the rotor 202 can be continuously rotated. Once a sign of the binary signal A or B is inverted, a reverse rotation is available.

Figure 7:
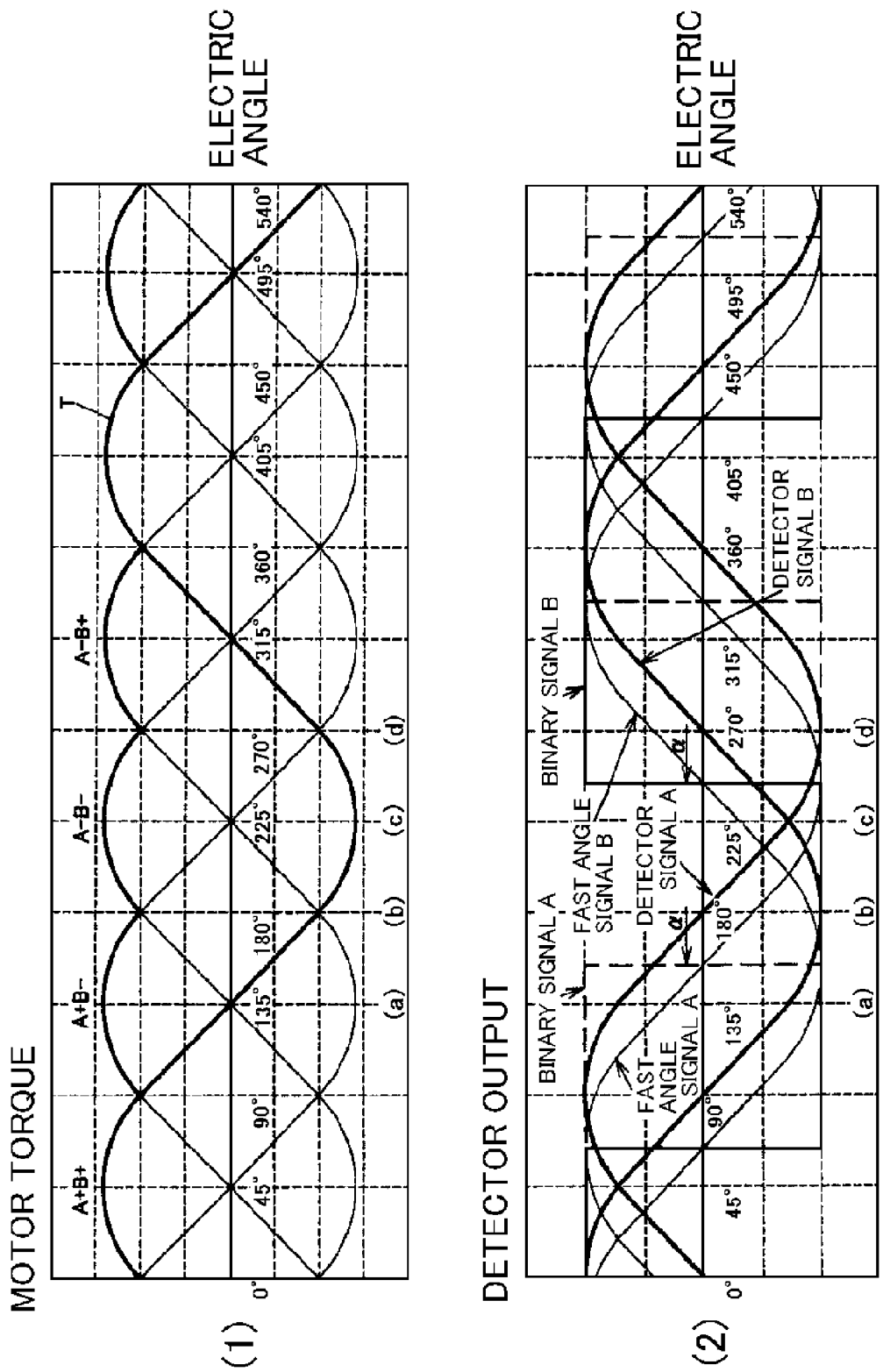
FIG. 7 is a graph showing a relationship among the rotational angle of the rotor having a fast angle α, the motor torque, and each signal output.

A description will now be given of the FB driving when the fast angle signal output from the fast angle circuit 147 has a fast angle α. FIG. 7(1) is a graph showing a relationship between a rotational angle of the rotor 202 and the motor torque when the fast angle signal output from the fast angle circuit 147 has a fast angle α. FIG. 7(2) is a graph showing a relationship between the rotational angle of the rotor 202 and the signal output of the position detector 142, where the abscissa axis denotes an electric angle and the ordinate axis denotes an output of each signal. In FIG. 7(2), the fast angle A moves ahead of the detector signal A by the fast angle α, and the fast angle B moves ahead of the detector signal B by the fast angle α. In addition, the binary signals A and B generated based on the fast angle signal also move ahead of the detector signals A and B by the fast angle α. In the FB driving, the electrification to the coil 203 is switched based on the binary signal A, and the electrification to the coil 204 is switched based on the binary signal B. Therefore, the electrification switching timings of the coils 203 and 204 are faster by the fast angle α than the case having a fast angle of zero.

Figure 8:
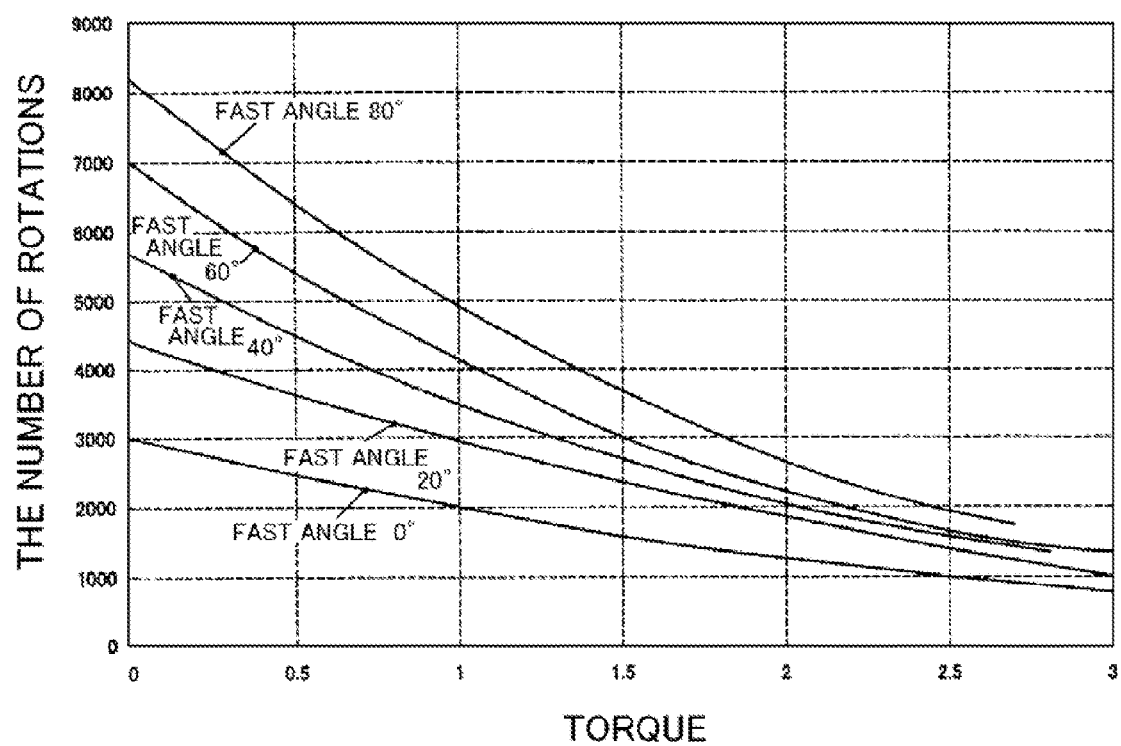
FIG. 8 is a graph showing a relationship among the torque and the number of rotations when the fast angle is changed.

FIG. 8 is a graph showing a relationship between the torque and the number of rotations when the fast angle is changed, where the abscissa axis denotes the motor torque and the ordinate axis denotes the number of rotations of the motor. It is understood from this graph that the relationship varies between the torque and the number of rotations according to the torque α. By using this characteristic, the fast angle control that changes the fast angle α is provided according to the driving condition in the FB driving. It is possible to control the driving velocity by controlling the fast angle α in the FB driving under the constant load condition.

When the zoom lens 110 and the focus lens 120 are intermittently driven, for example, by repeating the still picture photography, the electrification to the coil 203 or 204 in the motor 112 and 140 can be stopped in the stop time or the current can be reduced. At this time, the heat generated from the coil 203 or 204 during the driving time can be radiated at the stop time, and the heat generation from the motor 140 can be restrained.

On the other hand, in continuously driving the zoom lens 110 and the focus lens 120, for example, in the motion picture photography, the coils 203 and 204 in the motors 112 and 140 are continuously electrified. Therefore, the heat generated from the coil 203 or 204 is less likely to be radiated and it becomes difficult to restrain the heat generation of the motor 140. Therefore, the temperature around the motor in the continuous driving is higher than that of the intermittent driving. In addition, the temperature around the motor is likely to also rise due to a change of the environment temperature, a friction of the movable part, and the heat generation of another electronic unit in the camera 100.

Figure 9:
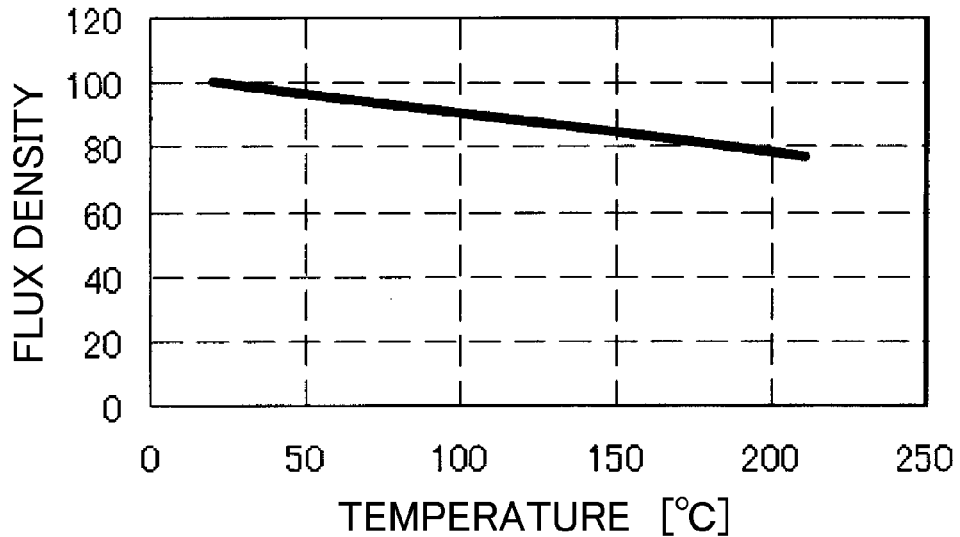
FIG. 9 is a graph showing a temperature characteristic of a flux density of the magnet shown in FIG. 2.

FIG. 9 is a graph showing a temperature characteristic of a magnetic flux density of the magnet 201. As the temperature around the motor 140 increases, the magnetic flux density of the magnet 201 is lowered due to the demagnetization of the magnet 201 as the temperature rises. Since this embodiment detects the magnetic flux density of the magnet 201 using the Hall element, the output of the Hall element lowers as the temperature rises and the SN ratio deteriorates.

Figure 10:
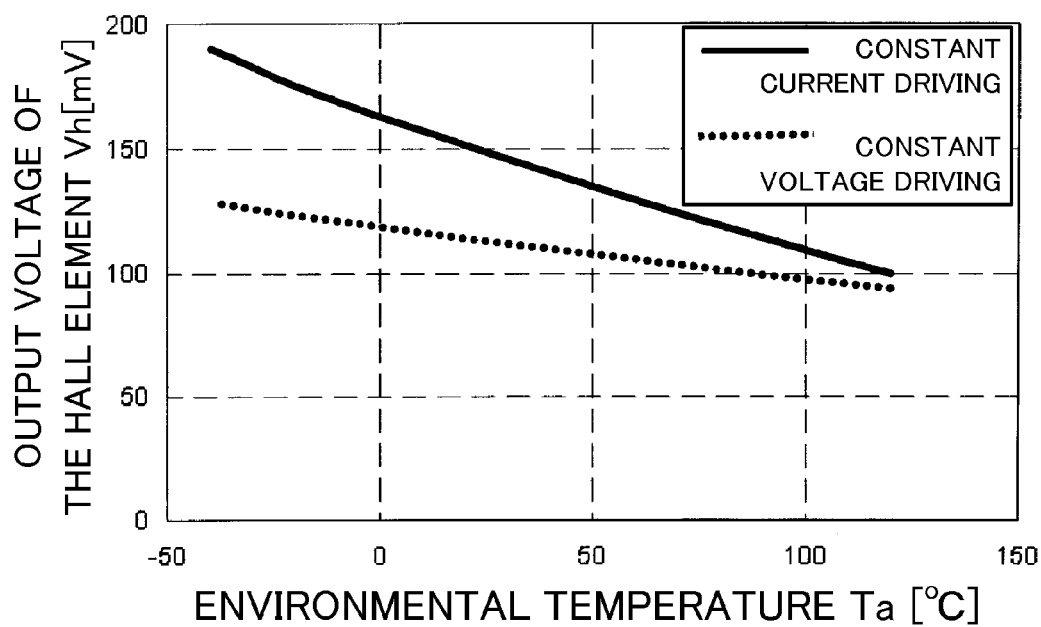
FIG. 10 is a graph showing a temperature characteristic of a Hall element.

FIG. 10 is a graph showing a temperature characteristic of the Hall element in this embodiment. As the temperature around the motor 140 increases, the output of the Hall element lowers and the SN ratio lowers as the temperature increases due to the temperature characteristic of the Hall element. This embodiment uses the Hall element for the position detector 142 but even when another position detector is used its output may lower and the SN ratio may deteriorate by the temperature characteristic of the position detector 142. In addition, it is conceivable that other than the temperature rise, the SN ratio of the Hall element may lower due to the incoming noises.

A description will now be given of the influence of the deteriorated SN ratio associated with the drop of the output of the position detector 142 on the driving of the motor 140. When the fast angle is zero, the detector signal accords with the fast angle signal. In addition, the following description uses only a signal of the single position detector 142.

Figure 11:
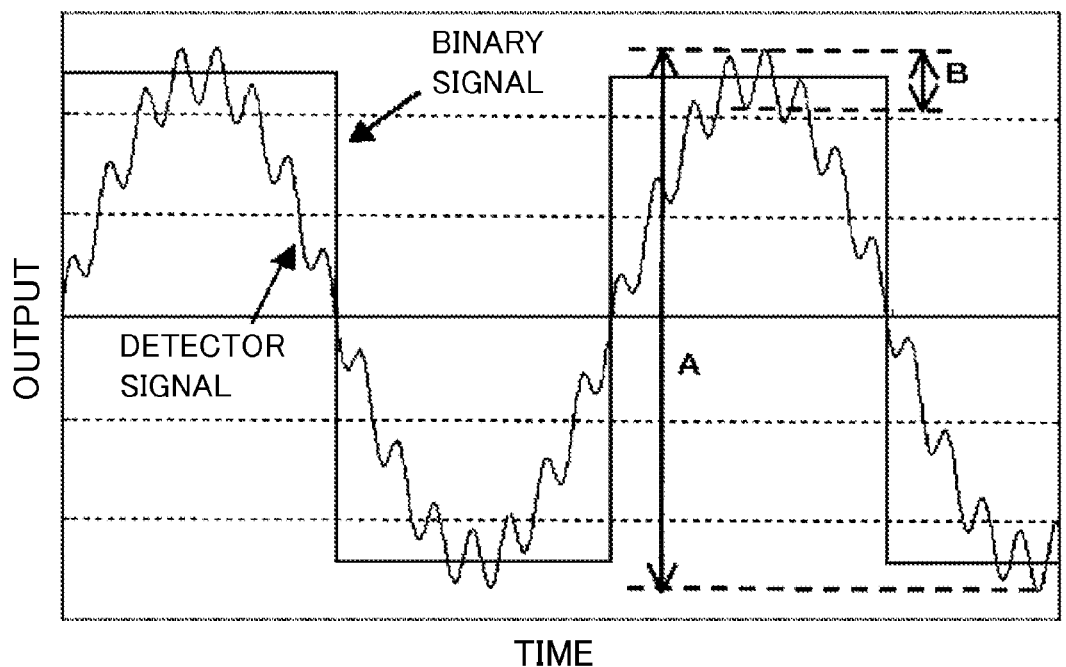
FIG. 11 is a graph showing an output of the position detector in the usual state.

FIG. 11 is a graph showing an output of the position detector 142 when the rotor 202 rotates at a constant velocity and the output of the position detector 142 is maintained in the usual state. In FIG. 11, the N pole or S pole of the magnet 201 passes four times opposite to the position detector 142, and a detector signal of two periods or smaller is illustrated. The detector signal is obtained as a synthesized signal (amplitude A) between a sine wave corresponding to a rotation of the rotor 202 and a noise (noise width B) relative to the detector signal. Under the condition shown in FIG. 11, the binary signal inverts three times with switching of the magnetic pole, and is output in synchronization with the rotation of the rotor 202. Therefore, in the FB driving, the electrification is switched with switching of the magnetic pole, and the FB driving can become stable because the electrification to the coil 203 or 204 is normally performed in synchronization with the rotation of the rotor 202. On the other hand, the OP driving can be stable because it does not use the detector signal.

Figure 12:
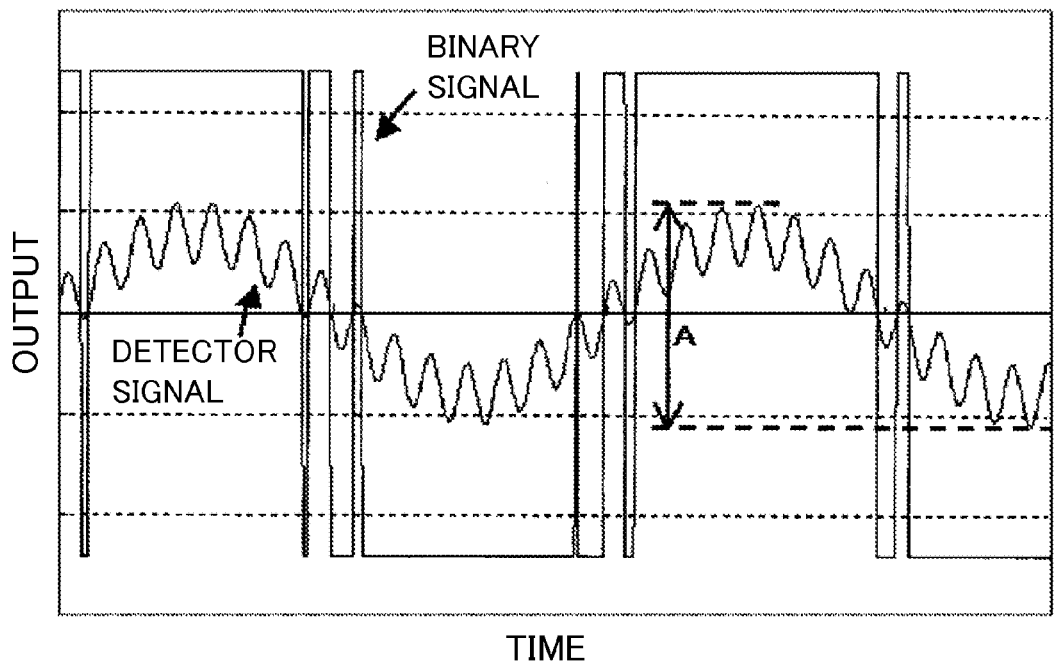
FIG. 12 is a graph showing the output of the position detector when the output lowers.

FIG. 12 is a graph showing an output of the position detector 142 when the rotor 202 rotates at a constant velocity and the output of the position detector 142 lowers. In FIG. 12, the N pole or S pole of the magnet 201 passes four times opposite to the position detector 142, and a detector signal of two periods or smaller is illustrated. The detector signal is obtained as a synthesized signal (amplitude A) between a sine wave corresponding to a rotation of the rotor 202 and a noise relative to the detector signal. The detector signal of FIG. 12 is smaller than the detector signal of FIG. 11 in amplitude of the sine wave corresponding to the rotation of the rotor 202. Thus, the SN ratio reduces and the signal is subject to the signal noises. Under the condition shown in FIG. 12, the binary signal inverts a plurality of times around switching of the magnetic pole. Therefore, in the FB driving, the electrification is switched around switching of the magnetic pole a plurality of times, and the electrification of the coil cannot be normally switched in synchronization with the rotation of the rotor 202. As a consequence, as the detector output lowers, the stable FB driving becomes hard to obtain. On the other hand, the OP driving can be stable because it does not use the detector signal.

A description will now be given of a selection of one of the first driver 144 and the second driver 146 by the control circuit 150. The control circuit 150 selects one of the first driver 144 and the second driver 146 (or one of the OP driving and the FB driving) in accordance with the position detector 142, and drives the focus lens 120.

Figure 13:
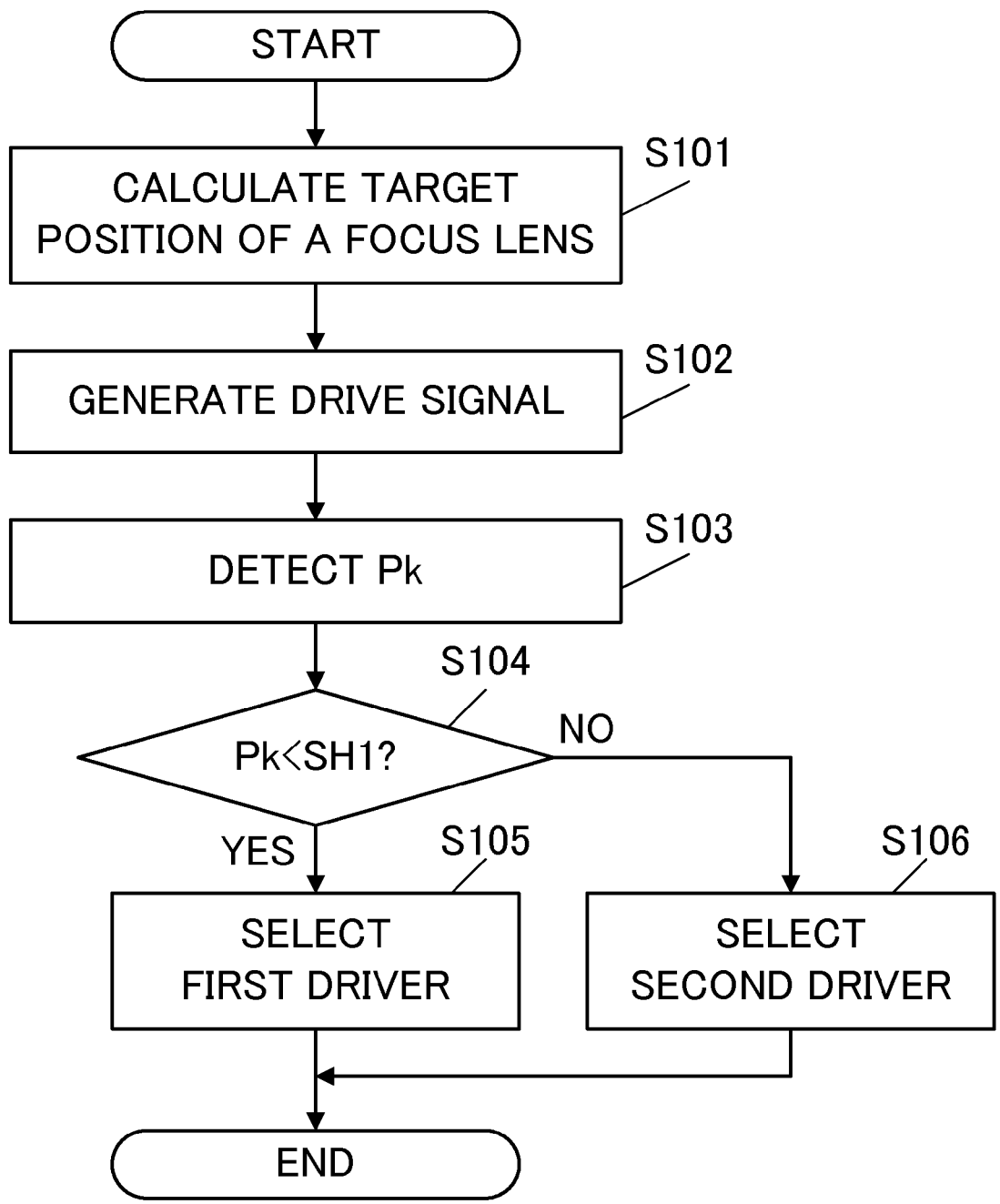
FIG. 13 is a flowchart showing a drive state of the focus lens by a control circuit according to the first embodiment.

FIG. 13 is a flowchart showing a drive process of the focus lens 120 by the control circuit 150 of this embodiment, and "S" denotes an abbreviation of the step. When the drive process starts, the control circuit 150 detects the current in-focus position, and calculates a target position of the focus lens 120 (S101). Thereafter, it generates a focus lens driving signal is to be supplied to the first driver 144 or the second driver 146 from the calculated target position of the focus lens 120 (S102).

Next, the control circuit 150 detects a peak value Pk of the detector output based on the output of the position detector 142 (S103). The "peak value Pk," as used herein, means a smaller or minimum value of the peak values of the amplitude of the two output signals from the position detector 207 and 208. When the controller 150 detects the peak value Pk, the control circuit 150 compares it with a preset (first) threshold SH1 (S104).

When the control circuit 150 determines that the peak value Pk is smaller than the threshold SH1 (Yes of S104), the control circuit 150 outputs the drive signal to the first driver 144, drives the focus lens 120 in accordance with the OP driving (S105), and terminates the process. On the other hand, when the control circuit 150 determines that the peak value Pk is equal to or larger than the threshold SH1 (No of S104), the control circuit 150 outputs the drive signal to the second driver 146, drives the focus lens in accordance with the FB driving (S106), and terminates the process. In other words, the control circuit 150 selects the OP driving when determining that the peak value Pk is smaller than the threshold SH1 (first threshold), and selects the FB driving when determining that the peak value Pk is equal to or greater than the threshold SH1.

Since the amplitude A of the detector signal in FIGS. 11 and 12 is equivalent to the peak value Pk detected by the control circuit 150, the stable FB driving becomes difficult as the detector output (or peak value Pk) lowers. This embodiment sets the threshold SH1 for the peak value of the detector signal when the stable FB driving is available, switches to the OP driving so as to maintain the stable driving of the motor 140 when the peak value Pk becomes less than the threshold SH1 and the binary signal becomes out of synchronization with the rotation of the rotor.

The control circuit 150 may provide the determination of the S104 a predetermined time period after it obtains the output of the position detector 142 (or a predetermined time period after the peak value changes). Thereby, even when the peak value Pk fluctuates around the threshold, the driving control is not frequently switched and thus the driving of the motor can become stable. A delay of the determination may be achieved by measuring the predetermined time period by the timer in the control circuit 150 or by using the delay circuit, such as a shift register.

Figure 14:
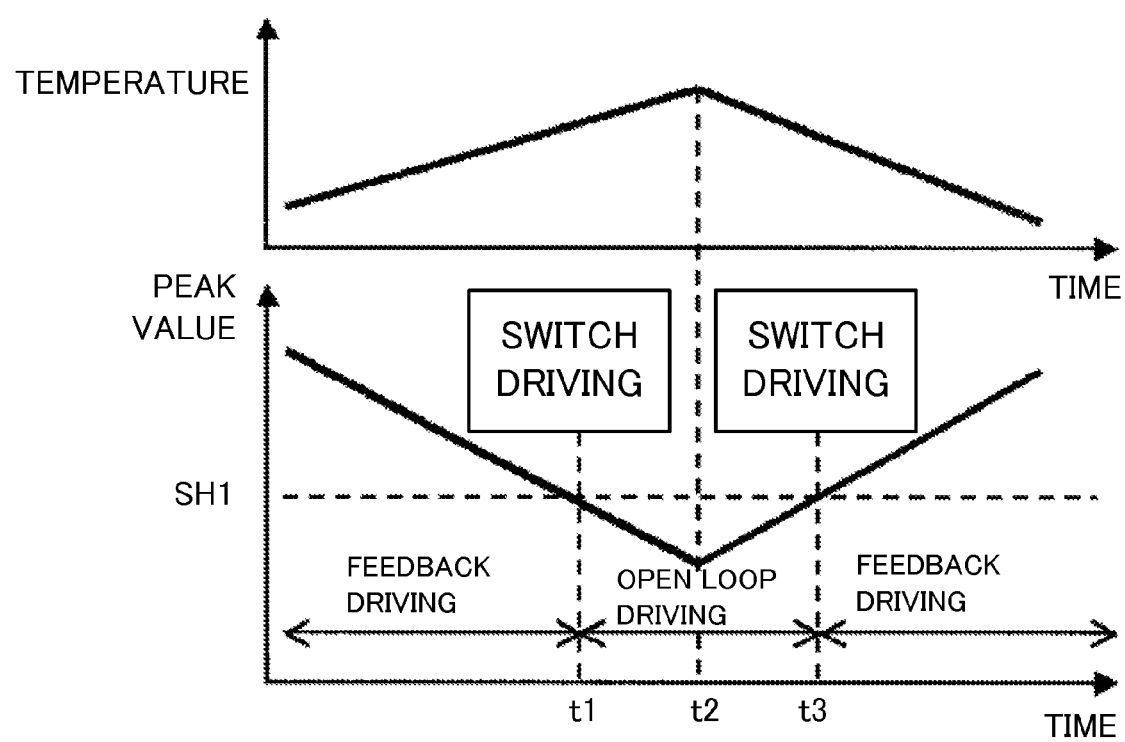
FIG. 14 is a timing chart showing an operation of the control circuit when the output of the position detector lowers due to the temperature rise according to the first embodiment.

FIG. 14 is a timing chart showing an operation of the control circuit 150 when the output of the position detector 142 lowers due to the temperature rise in this embodiment. When the motor 140 is continuously driven in accordance with the FB driving, the temperature of the motor 140 increases, the output of the Hall element as the position detector 142 lowers accordingly, and the peak value Pk lowers. When the peak value Pk becomes less than the threshold SH1 at t1, the control circuit 150 switches the driving method to the OP driving. When the continuous driving of the motor 140 is completed and the intermittent driving starts at t2, the heat of the motor 140 is radiated and the peak value Pk rises. When the peak value Pk becomes larger than the threshold SH1 at t3, the control circuit 150 switches the driving method to the FB driving. Since the threshold SH1 is set to the peak value of the detector signal when that the FB driving is stable, the motor 140 can be stably driven in accordance with the OP driving when the output of the position detector 142 becomes too low to provide the stable FB driving.

Thus, the camera 100 of this embodiment switches the FB driving to the OP driving and stabilizes the driving of the motor 140, when the temperature of the motor 140 rises in the FB driving and the output of the position detector 142 lowers.

Second Embodiment

Figure 15:
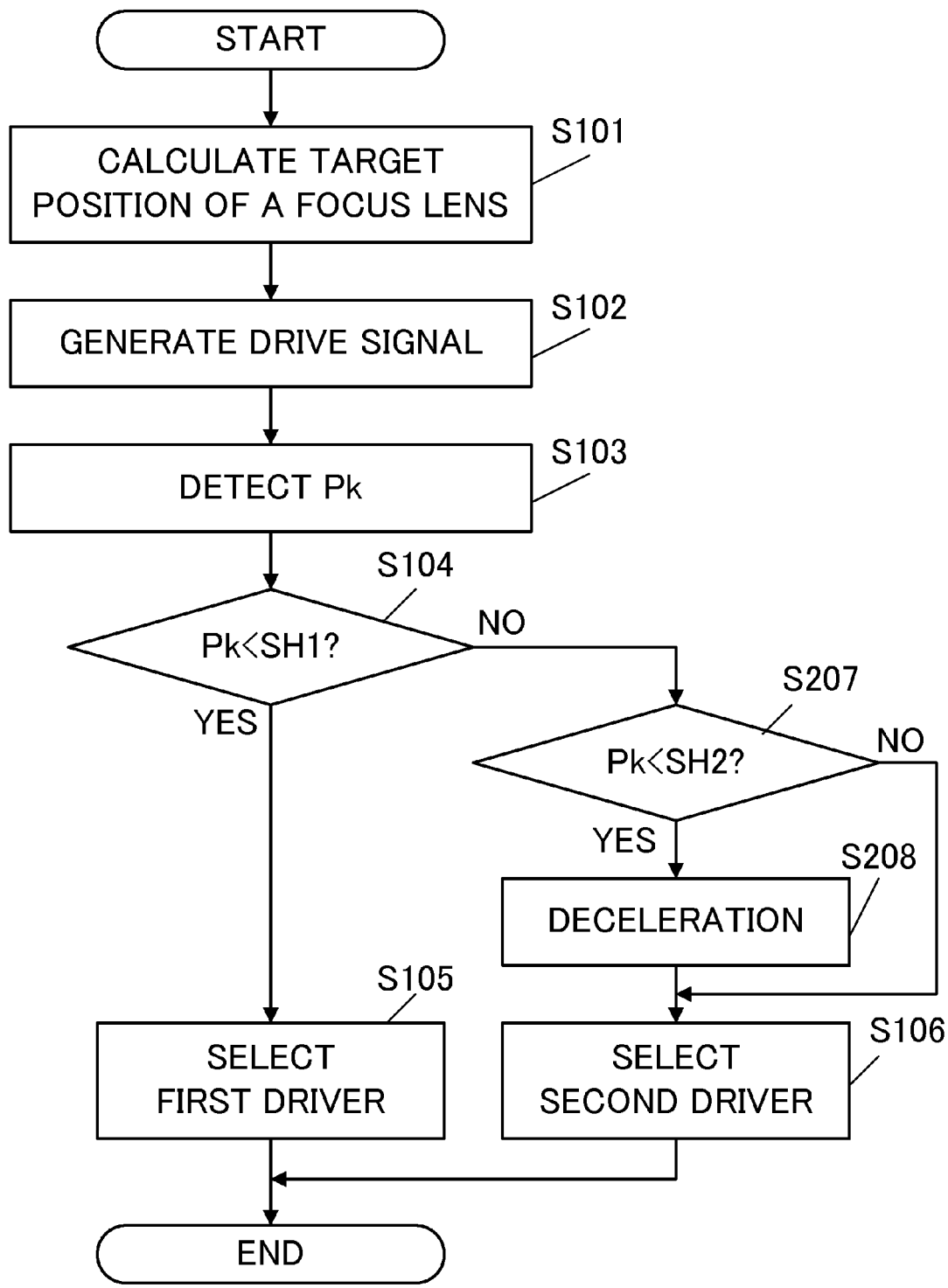
FIG. 15 is a flowchart showing a drive process of a focus lens by the control circuit according to a second embodiment.

The second embodiment uses the structures similar to the camera 100 and the motor 140, and is different from the first embodiment in the drive process of the focus lens 120 by the control circuit 150. FIG. 15 is a flowchart showing the drive process of the focus lens 120 by the control circuit 150 of this embodiment, and the steps in FIG. 15 which are similar to those shown in FIG. 13 are designated by the same reference numerals. The flow from S101 to S105 is the same as that shown in FIG. 13.

In FIG. 13, the control circuit 150 transfers the control to the OP driving when determining that the peak value Pk decreases in the FB driving and becomes less than the threshold SH1. On the other hand, in FIG. 15, when the control circuit 150 determines that the peak value Pk decreases in the FB driving and reaches a (second) threshold SH2 that is a value larger than the threshold SH1, the control circuit 150 decelerates the driving velocity of the motor 140 down to a velocity equal to or smaller than a step-out velocity in the OP driving. Here, the "step-out velocity," as used herein, means the maximum velocity in which no stepping out occurs in the OP driving under the predetermined load condition. This embodiment prevents a generation of the step out by switching the FB driving to the OP driving while maintaining the driving velocity smaller than the step-out velocity.

More specifically, in FIG. 15, when the control circuit 150 determines that the peak value Pk is equal to or larger than the threshold SH1 (No of S104), the control circuit 150 compares the peak value Pk with the preset threshold SH2 that is larger than the threshold SH1 (S207). When the control circuit 150 determines that the peak value Pk is smaller than the (second) threshold SH2 (Yes of S207), the control circuit 150 provides such a deceleration process that the driving velocity of the focus lens 120 can be equal to or smaller than the driving velocity V2 equal to or smaller than the step-out velocity (S208). The deceleration process may use the current control by controlling the current that flows in the coil and by controlling the velocity, and may provide a fast angle control by controlling a phase difference (fast angle) between the detector signal and the fast angle signal, by changing the torque—the number of rotations characteristic, and by controlling the velocity. After S208 or when the control circuit 150 determines that the peak value Pk is equal to or larger than the (second) threshold SH2 (No of S207), the control circuit 150 outputs the driving signal to the second driver 146. The control circuit 150 drives the focus lens 120 in accordance with the FB driving (S106), and terminates the drive process. Thus, the control circuit 150 selects the OP driving when the peak value Pk is smaller than the threshold SH1, the FB driving when the peak value Pk is larger than SH2, and the FB driving when the peak value is between SH2 and SH1 so that the driving velocity can be equal to or smaller than V2.

This embodiment sets the peak value of the detector signal when the FB driving is stable, to the threshold SH1, and switches the FB driving to the OP driving so as to maintain the stable driving of the motor 140, when the peak value Pk becomes less than the threshold SH1 and the binary signal becomes out of synchronization with the rotation of the rotor.

In addition, this embodiment sets the driving velocity V2 to a value equal to or smaller than the step-out velocity in the OP driving, and the threshold SH2 to a value larger than the threshold SH1. As a result, as the peak value Pk decreases in the FB driving, the peak value Pk reaches the threshold SH2 before it reaches the threshold SH1, and the driving velocity of the motor 140 is reduced down to a value equal to or smaller than the step-out velocity. Then, the peak value Pk further reduces and becomes smaller than the threshold SH1, and the FB driving is switched to the OP driving. At this time, since the driving velocity is equal to or smaller than the step-out velocity, the step out in the OP driving can be avoided.

The control circuit 150 may provide the determination of the S207 a predetermined time period after it obtains the output of the position detector 142 (or a predetermined time period after the peak value changes). Thereby, even when the peak value Pk fluctuates around the threshold, the driving control is not frequently switched and thus the driving of the motor can become stable. A delay of the determination may be achieved by measuring the predetermined time period by the timer in the control circuit 150 or by using the delay circuit, such as a shift register.

Figure 16:
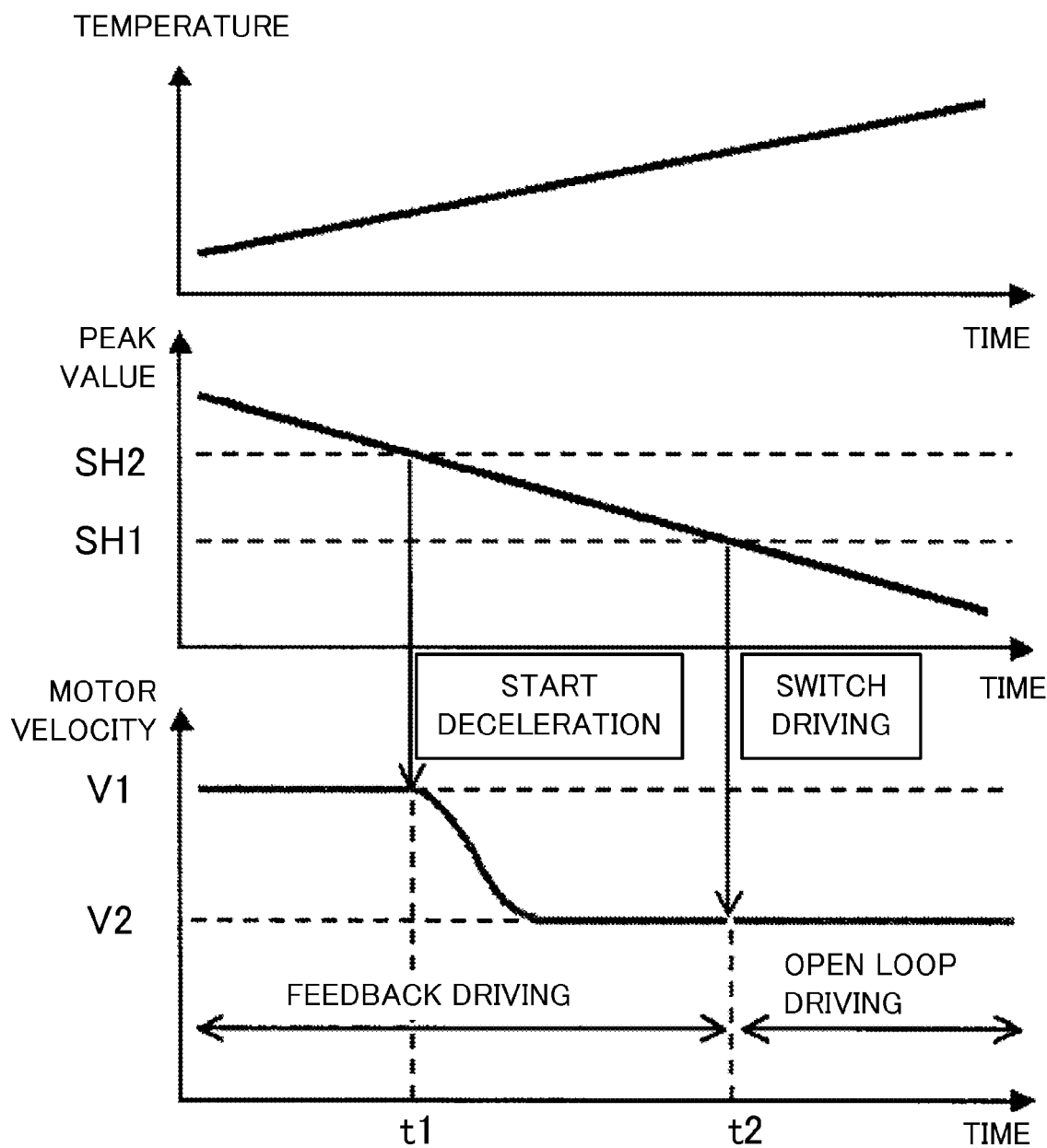
FIG. 16 is a timing chart showing an operation of the control circuit when the output of the position detector lowers due to the temperature rise according to the second embodiment.

FIG. 16 is a timing chart showing an operation of the control circuit 150 when the output of the position detector 142 lowers due to the temperature rise in this embodiment. When the motor 140 is continuously driven in accordance with the FB driving, the temperature of the motor 140 increases, the output of the Hall element as the position detector 142 lowers accordingly, and the peak value Pk lowers. When the peak value Pk becomes lower than the threshold SH2 at t1, the control circuit 150 controls the second driver 146 and decelerates the motor 140 in such a manner that the driving velocity V1 can become the driving velocity V2 or smaller. When the peak value Pk of the position detector 142 lowers and becomes less than the threshold SH1 at t2, the control circuit 150 switches the driving method to the OP driving. At this time, since the driving velocity of the motor 140 is set to the driving velocity V2 that is equal to or smaller than the step-out velocity in the OP driving, a generation of the step out can be restrained which would otherwise occur in switching to the OP driving.

Thus, the camera of this embodiment switches the FB driving to the OP driving and stabilizes the driving of the motor 140, when the temperature of the motor 140 rises in the FB driving and the output of the position detector 142 lowers. In addition, this embodiment also stabilizes switching from the FB driving to the OP driving.

Third Embodiment

Figure 17:
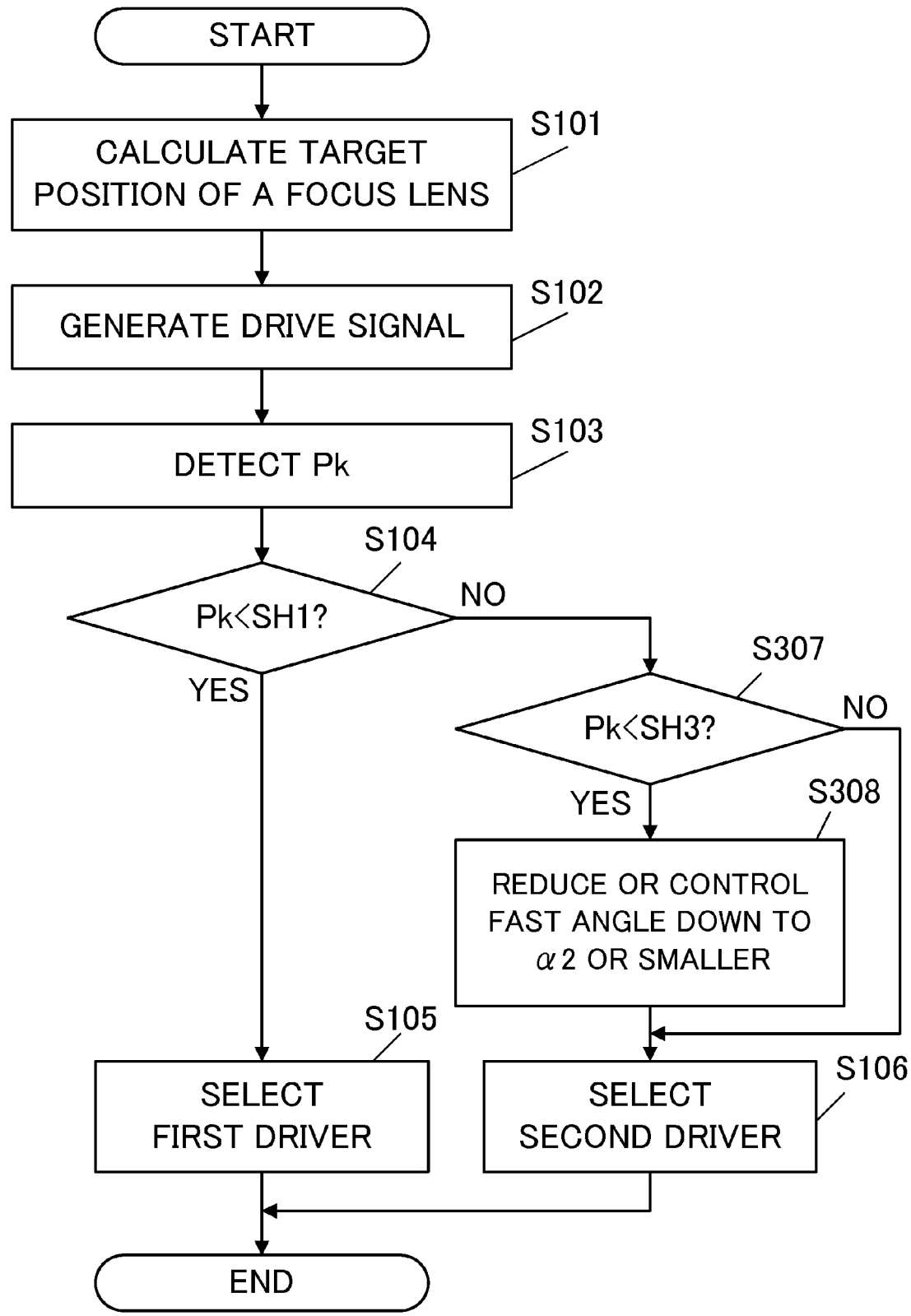
FIG. 17 is a flowchart showing a drive process of a focus lens by the control circuit according to a third embodiment.

The third embodiment uses the structures similar to the camera 100 and the motor 140, and is different from the first embodiment in the drive process of the focus lens 120 by the control circuit 150. FIG. 17 is a flowchart showing the drive process of the focus lens 120 by the control circuit 150 of this embodiment, and the steps in FIG. 17 which are similar to those shown in FIG. 13 are designated by the same reference numerals. The flow from S101 to S105 is the same as that shown in FIG. 13.

In FIG. 13, the control circuit 150 transfers the control to the OP driving when determining that the peak value Pk decreases in the FB driving and becomes less than the threshold SH1. In the OP driving, the rotor's rotation or the fast angle is set to zero or a phase difference corresponding to a response delay of the rotor, but in the FB driving the fast angle α is set to an arbitrary value. It is necessary for the high-speed FB driving to set the fast angle α to a value larger than that of the OP driving but the step out may occur when the FB driving is switched to the OP driving at this state due to a sudden change of the fast angle. Accordingly, in FIG. 17, when the control circuit 150 determines that the peak value Pk decreases in the FB driving and reaches a (third) threshold SH3 that is a value larger than the threshold SH1, the control circuit 150 reduces or adjust the phase difference (fast angle) between the signal of the position detector 142 and the fast angle signal. In this case, the fast angle is reduced (or adjusted) to zero or a value equivalent to the phase difference corresponding to the response delay of the rotor in the OP driving. This embodiment prevents a generation of the step out by switching the FB driving to the OP driving while maintaining the fast angle to be zero or a value equivalent to the phase difference corresponding to the response delay of the rotor in the OP driving.

More specifically, in FIG. 17, when the control circuit 150 determines that the peak value Pk is equal to or larger than the threshold SH1 (No of S104), the control circuit 150 compares the peak value Pk with the preset threshold SH3 that is larger than the threshold SH1 (S307). When the control circuit 150 determines that the peak value Pk is smaller than the (third) threshold SH3 (Yes of S307), the control circuit 150 sets the fast angle to zero or a value equivalent to the phase difference corresponding to the response delay of the rotor in the OP driving (S308). After S308 or when the control circuit 150 determines that the peak value Pk is equal to or larger than the (third) threshold SH3 (No of S307), the control circuit 150 outputs the driving signal to the second driver 146. The control circuit 150 drives the focus lens 120 in accordance with the FB driving (S106), and terminates the drive process. Thus, the control circuit 150 selects the OP driving when the peak value Pk is smaller than the threshold SH1, the FB driving when the peak value Pk is larger than SH3, and the FB driving when the peak value is between SH3 and SH1 such that the fast angle can be α2 or smaller.

This embodiment sets the peak value of the detector signal when the FB driving is stable, to the threshold SH1, and switches the FB driving to the OP driving so as to maintain the stable driving of the motor 140, when the peak value Pk becomes less than the threshold SH1 and the binary signal becomes out of synchronization with the rotation of the rotor.

In addition, this embodiment sets the fast angle α2 to zero or a value equivalent to the phase difference corresponding to the response delay of the rotor in the OP driving, and the threshold SH3 to a value larger than SH1. As a result, when the peak value Pk decreases in the FB driving, the peak value Pk reaches the threshold SH3 before it reaches the threshold SH1 and the fast angle of the motor 140 can be reduced to zero or a value equivalent to the phase difference corresponding to the response delay of the rotor in the OP driving. Then, the peak value Pk further reduces and becomes smaller than the threshold SH1, and the FB driving is switched to the OP driving. At this time, since the fast angle is set to zero or equal to or smaller than a value equivalent to the phase difference corresponding to the response delay of the rotor in the OP driving, a change of the fast angle is so small that the step out in switching to the OP driving can be avoided and stable driving can be provided.

The control circuit 150 may provide the determination of the S307 a predetermined time period after it obtains the output of the position detector 142 (or a predetermined time period after the peak value changes). Thereby, even when the peak value Pk fluctuates around the threshold, the driving control is not frequently switched and thus the stable driving of the motor can be maintained. A delay of the determination may be achieved by measuring the predetermined time period by the timer in the control circuit 150 or by using the delay circuit, such as a shift register.

Figure 18:
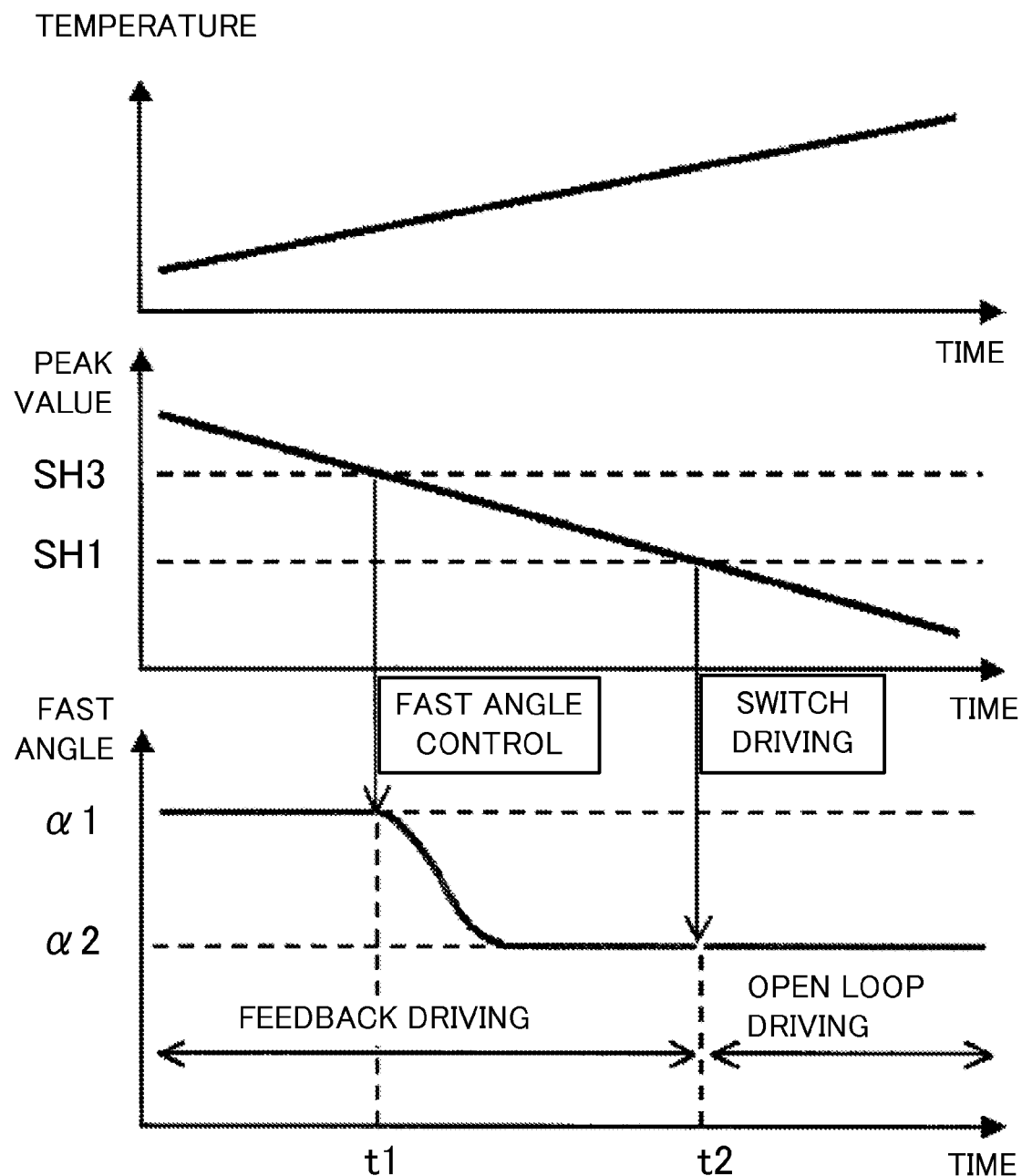
FIG. 18 is a timing chart showing an operation of the control circuit when the output of the position detector lowers due to the temperature rise according to the third embodiment.

FIG. 18 is a timing chart showing an operation of the control circuit 150 when the output of the position detector 142 lowers due to the temperature rise in this embodiment. Assume that the motor 140 is driven in accordance with the FB driving with the fast angle α1 larger than the fast angle α2. When the motor 140 is continuously driven at this state in accordance with the FB driving, the temperature of the motor 140 increases, the output of the Hall element as the position detector 142 lowers accordingly, and the peak value Pk lowers. When the peak value Pk becomes lower than the threshold SH3 at t1, the control circuit 150 controls the second driver 146 in such a manner that the fast angle can be α2 or smaller. When the peak value Pk of the position detector 142 further lowers and becomes less than the threshold SH1 at t2, the control circuit 150 switches the driving method to the OP driving. At this time, since the fast angle is set equal to or smaller than zero or a value equivalent to the phase difference corresponding to the response delay of the rotor in the OP driving, a generation of the step out can be restrained which would otherwise occur in switching to the OP driving.

Thus, the camera of this embodiment switches the FB driving to the OP driving when the temperature of the motor 140 rises in the FB driving and the output of the position detector 142 lowers, and this embodiment can drive the motor 140 stably. In addition, this embodiment also stabilizes switching from the FB driving to the OP driving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-270273, filed Oct. 20, 2008, which is hereby incorporated by reference herein in its entirety.

What is claimed is:

1. A drive apparatus comprising:
a magnet rotor having a plurality of magnetic poles that are magnetized;
a stator having a magnetic pole portion that opposes each magnetic pole of the magnet rotor;
a coil configured to excite the magnetic pole portion;
a position detector configured to detect a position of the magnet rotor;
a first driver configured to switch an electrification state of the coil in accordance with a preset time interval;
a second driver configured to switch an electrification state of the coil in accordance with an output signal of the position detector; and
a controller configured to select the first driver or the second driver,
wherein the controller selects the first driver when a peak of the output signal of the position detector is less than a first threshold,
wherein the controller selects the second driver when the peak of the output signal of the position detector is equal to or larger than the first threshold,
wherein the first threshold is set at the peak of the output signal of the detector signal when a stable driving by the second driver is available, and
wherein the controller decelerates the magnet rotor when the peak of the output signal of the position detector is between the first threshold and a second threshold that is larger than the first threshold.

2. The drive apparatus according to claim 1, wherein the controller determines whether the peak of the output signal of the position detector is less than the second threshold or equal to or larger than the second threshold after a predetermined time has elapsed since the controller obtains the output signal of the position detector.

3. A drive apparatus comprising:
a magnet rotor having a plurality of magnetic poles that are magnetized;
a stator having a magnetic pole portion that opposes each magnetic pole of the magnet rotor;
a coil configured to excite the magnetic pole portion;
a position detector configured to detect a position of the magnet rotor;
a first driver configured to switch an electrification state of the coil in accordance with a preset time interval;
a second driver configured to switch an electrification state of the coil in accordance with an output signal of the position detector; and
a controller configured to select the first driver when a peak of the output signal of the position detector is less than a first threshold, and to select the second driver when the peak of the output signal of the position detector is equal to or larger than the first threshold, and
wherein the controller adjusts, when the peak of the output signal of the position detector is between the first threshold and a third threshold that is larger than the first threshold, a value of a phase difference between the output signal of the position detector and a fast angle signal having a fast angle relative to a detection result of the position detector to zero or a value corresponding to a response delay of the magnet rotor in driving by the first driver.

4. The drive apparatus according to claim 3, wherein the controller determines the output of the position detector is less than the third threshold or equal to or larger than the third threshold after a predetermined time has elapsed since the controller obtains the output signal of the position detector.

* * * * *